United States Patent Office 3,849,409
Patented Nov. 19, 1974

3,849,409
HEXAHYDROTRIAZINE PHOSPHONATE DERIVATIVES
Edward D. Weil, Hastings-on-Hudson, N.Y., assignor to Stauffer Chemical Company, New York, N.Y.
No Drawing. Continuation-in-part of application Ser. No. 139,222, Apr. 30, 1971, now Patent No. 3,762,865. This application Sept. 7, 1971, Ser. No. 178,417
Int. Cl. C07d 55/14
U.S. Cl. 260—248 NS
17 Claims

ABSTRACT OF THE DISCLOSURE

Hexahydrotriazine phosphonate derivatives corresponding to the structural formula:

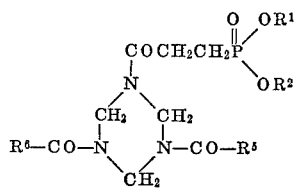

where $R^5$ and $R^6$ are the same or different radicals and are

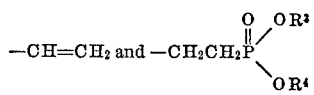

and $R^1$, $R^2$, $R^3$ and $R^4$ are the same or different radicals and are alkyl, cycloalkyl, alkenyl, alkylene, aryl or aralkyl said radicals having 1 to 20 carbon atoms and are either unsubstituted or substituted by non-interfering substituents such as halogen, alkoxy, or hydroxy; and mixtures thereof and processes for flame retarding textiles by applying thereto at least one hexahydrotriazine phosphonate derivative represented by the above structural formula wherein said phosphonate derivative, if unsaturated, is cured at a moderate temperature by free radical initiation or radiation so as to form an insoluble, fire retardant resinous finish.

CROSS-REFERENCE TO RELATED APPLICATION

This application is a continuation-in-part of co-pending application Ser. No. 139,222, entitled Flame Retarding of Solid Substrates With Allyl 2-Carbamoyl Alkyl Phosphonates, filed Apr. 30, 1971 by Edward D. Weil, now U.S. Pat. 3,762,865.

BACKGROUND OF THE INVENTION

In the above noted co-pending application, there is disclosed a process for flame retarding solid flammable substrates, such as textiles, comprising the application thereto of certain allyl-2-carbamoylalkyl phosphonates whereupon the phosphonate is cured by free radical initiation so as to form an insoluble, fire retardant resinous finish. Moreover, it is further disclosed therein that the use of certain other free radical curable comonomers along with the selected allyl-2-carbamoylalkyl phosphonate may be desirable as a means of achieving variations in the properties of the resulting treated textiles. As specific examples of such suitable flame retardant comonomers are disclosed the hexahydrotriazine phosphonate derivatives made by the base catalyzed addition of 1 to 2 moles of a dialkyl phosphite and/or 1 to 3 moles of diallyl phosphite to the double bonds of triacryloyl-hexahydrotriazine.

SUMMARY OF THE INVENTION

Thus, it is one object of this invention to provide novel hexahydrotriazine phosphonate derivatives which are useful as flame retarding agents.

Another object of the present invention is to provide a flame retardant textile or other solid substrate finishing process which is operable at ambient or moderately elevated temperatures and which can employ either an aqueous or organic solvent application medium.

A further object of the instant invention is to provide a flame retardant finishing process which is suitable for use with textiles made from either natural or synthetic fibers as well as with blends of each of the latter fiber types.

A still further object of this invention is to provide a flame retardant finishing process for various other flammable, solid substrates such, for example as synthetic resins, paper, wood, batting and rope, which are capable of being impregnated, admixed with and/or coated with a flame retardant, resinous finish.

DESCRIPTION OF THE PREFERRED EMBODIMENTS

The novel hexahydrotriazine phosphonate derivatives of this invention may be described as those compounds corresponding to the structural formula:

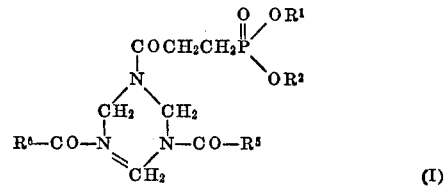

wherein $R^5$ and $R^6$ are the same or different radicals and are selected from the group consisting of

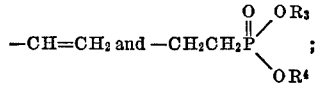

and wherein $R^1$, $R^2$, $R^3$ and $R^4$ are the same or different and are radicals selected from the group consisting of alkyl, cycloalkyl, alkenyl, alkylene, aryl, and arylalkyl; said $R^1$, $R^2$, $R^3$ and $R^4$ radicals having from 1 to about 20 carbon atoms and either substituted or unsubstituted by non-interfering substituents selected from the group consisting of halogen, alkoxy and hydroxy, wherein the terminal valency of any such alkylene radical is linked to the same phosphonate functional group, such as via a cyclic-methylene chain or linked to another phosphonate functional group conforming to structural formula I such as via a straight chain of methylene groups or via a series of cyclic-methylene chains connected through a spiro carbon; and mixtures of these phosphonate derivatives. Illustrative of alkyl are, for example, methyl, ethyl, propyl, isopropyl, butyl, amyl, hexyl, octyl, eicosyl and the like; illustrative of cycloalkyl are, for example, cyclopropyl, cyclopentyl, cyclohexyl, cyclooctyl and the like; illustrative of alkenyl, which is defined herein as an unsaturated monovalent radical, are, for example, allyl, crotyl, linoleyl and the like; illustrative of akylene, which is defined herein as a saturated divalent radical, are, for example, ethylene, tetramethylene, neopentylene, 1,2-propylene, hexylene; illustrative of aryl are, for example, phenyl, cresyl, naphthyl, nonylphenyl and the like; and illustrative of arylalkyl are, for example, benzyl, 2-phenylethyl, naphthylmethyl and the like. Substituted $R^1$, $R^2$, $R^3$ and $R^4$ radicals are exemplified by 2-chloroethyl, 2,3-dibromopropyl, methoxyethyl, 2-hydroxypropyl and ethyleneoxyethylene.

For some purposes, such as for a maximum of flame retardant efficiency, it is preferred that $R^1$, $R^2$, $R^3$ or $R^4$ be $C_1$–$C_4$ lower alkyl, $C_1$–$C_4$ alkenyl or $C_1$–$C_4$ alkylene such as methyl, ethyl, propyl, isopropyl, butyl, isobutyl, allyl, ethylene, propylene, etc., or $C_2$–$C_4$ brominated or chlorinated lower alkyl, alkylene or alkenyl having only beta and/or gamma halogens, rather than higher carbon containing radicals. However, for certain specific reasons, such as for greater water repellency it is sometimes advantageous to utilize C₅-C₂₀ alkyl or alkenyl, alkylene or halogenated alkyl, including polyfluoroalkyl.

Examples of specific compounds represented by the above structural formula (I) are:

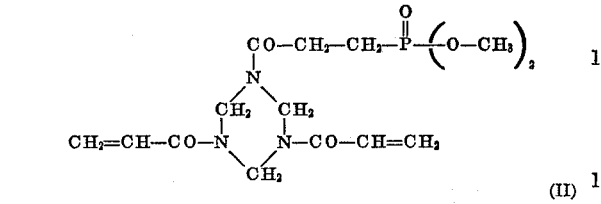

(II)

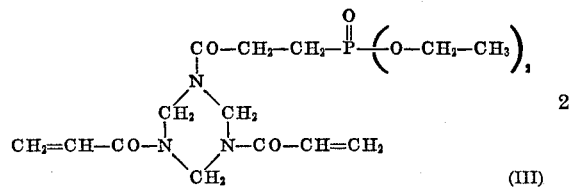

(III)

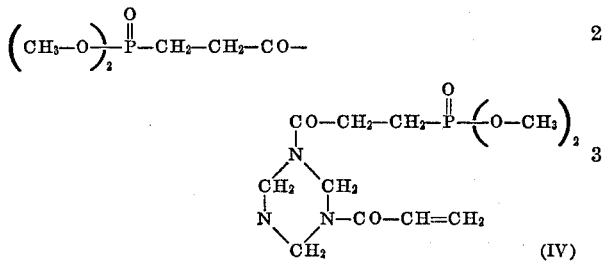

(IV)

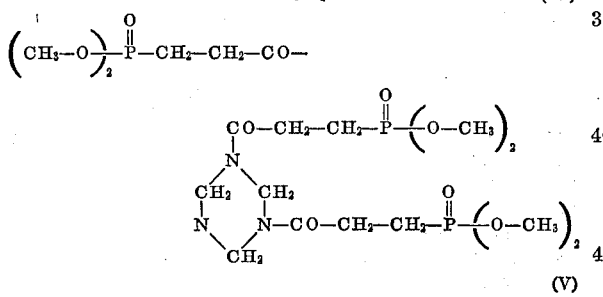

(V)

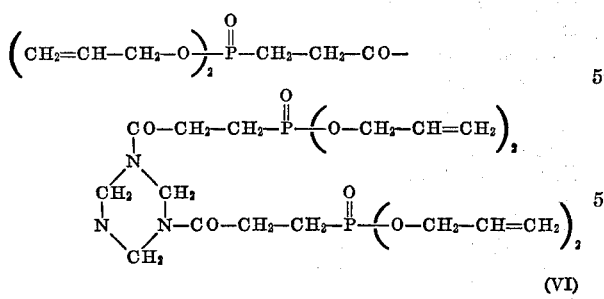

(VI)

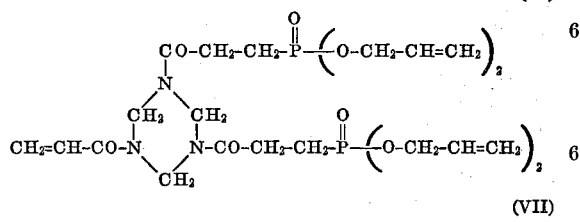

(VII)

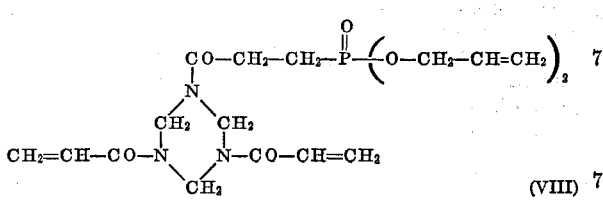

(VIII)

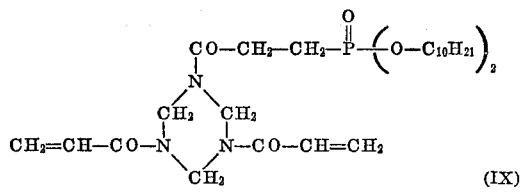

(IX)

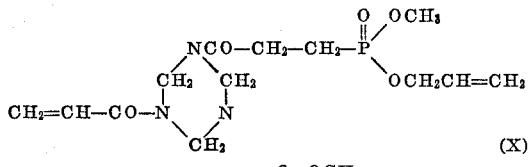

(X)

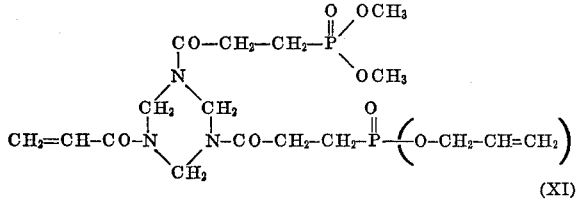

(XI)

These new hexahydrotriazine phosphonate derivatives of the instant invention are readily prepared by means of the base-catalyzed addition of about 1 to 3 moles of the appropriate phosphite or phosphites represented by the formula:

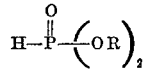

where R has the same significance as $R^1$, $R^2$, $R^3$, and $R^4$ as defined above to 1 mole of 1,3,5-triacryloylhexahydro-1,3,5-triazine. Suitable phosphites include, for example, dimethyl, diethyl, dipropyl, diisopropyl, diallyl, didodecyl, dieicosyl, methyl butyl, bis(2-chloroethyl), bis(2-ethoxyethyl), bis(2,3-dichloropropyl), bis(2,3-dibromopropyl), diphenyl, dicresyl, bis(nonylphenyl), bis(2,4,6-trichlorophenyl), bis(2,4-dibromophenyl), methyl phenyl, dibenzyl, di-p-bromobenzyl, dicyclohexyl,

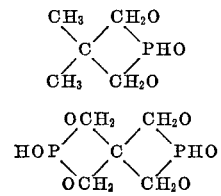

and

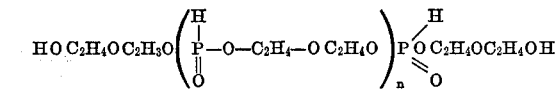

($n$=0 to 20.)

In general, as a result of the independent reactivity of each of the double bonds present in the starting 1,3,5-triacryloylhexahydro-1,3,5-triazine, the resultant hexahydrotriazine phosphonate products from the reaction of the above phosphites with said 1,3,5 - triacryloylhexahydro-1,3,5-triazine are statistical mixtures of the 1 to 1, 2 to 1, and 3 to 1 adducts. It is understood therefore, that the present invention encompasses these mixtures as well as the individual adducts which are readily separated from the mixtures by conventional procedures such as fractional crystallization or chromatography.

In conducting this reaction, the particular di-substituted phosphite and 1,3,5 - triacryloylhexahydro-1,3,5-triazine may be combined in the absence of a solvent or they may be mixed in a suitable inert solvent. Generally, however, when a 1 to 1 or 2 to 1 adduct is being prepared, it is preferred to employ an inert solvent which is capable of dissolving all or a substantial portion of the triacryloylhexahydrotriazine. Solvents particularly suitable for this purpose include dioxane, dimethoxyethane, tetrahydrofuran and methylene chloride. Methylene chloride, however, is most preferred.

Of course, these solvents are also suitable for use in preparing any of the 3 to 1 adducts contemplated within the scope of this invention. Other solvents also suitable for this purpose include benzene, toluene and acetone. The selected base catalyst which can be sodium methylate, potassium or sodium metal (which appears to form the phosphite anion *in situ*), lithium alkyl, methylmagnesium bromide, sodium amide, tetramethylguanidine, triethylenediamine, an alkali metal hydroxide or any other suitable basic material capable of abstracting a proton from the $HPO(OR)_2$ compound, is then introduced into the reaction mixture in a concentration of from at about 0.001 to 10%, as based upon the di-substituted phosphite, at about 0° to 150° C. resulting in an exothermic reaction which may cause the mixture to boil, or which may be moderated by external cooling. The reaction is observed to be complete when the phosphate is substantially all consumed, as measured by infrared or other assay.

In another embodiment, the present invention relates to the process comprising the application to a textile, or other flammable solid substrate, followed by curing, of an effective flame retarding amount of at least one hexahydrotriazine phosphonate derivative corresponding to structural formula I. These flame retardant compounds are applied to a fabric or other substrate at a concentration of from about 5 to about 50%, as calculated on the dry weight of the substrate, and are thereafter cured, i.e., polymerized, so as to form an insoluble, fire retardant, resinous finish by free radical initiation using either a chemical initiator or actinic radiation in order to induce the desired reaction.

While the use of aqueous solutions comprises the most economical means of application for these hexahydrotriazine phosphonate derivatives, they may also, if desired, be applied to a normally flammable substrate while dissolved in any of the organic solvents commonly used in the solvent finishing of textiles including for example, trichloroethylene, dichloroethane, trichloroethane, perchloroethylene, methylene chloride, etc., and mixtures thereof including emulsified mixtures with water. The solutions, either aqueous or organic solvent, containing one or more of the selected hexahydrotriazines phosphonate derivatives may be applied to textiles or other substrates by the use of any desired procedure. It is merely necessary to have the particular phosphonate or phosphonates evenly absorbed throughout the mass of the textile, or other substrate, and/or to apply it to at least one surface thereof by means of any convenient procedure. Accordingly, it may be applied by being sprayed onto one or both surfaces of the substrate or, as is more frequently the case, the substrate may be passed or padded through the solution while the latter is being held in a tank or other suitable container. Such a process is commonly referred to as a "padding technique" with the solution being referred to as a "padding bath" or "padding solution."

The concentration of the hexahydrotriazine phosphonate derivative within the padding bath, or other applicable solution, will be dependent upon a number of factors including, in the case of textile substrates the nature of the fibers which comprise the textile substrates, the nature of the fibers which comprise the textile, the weight and weave of the textile, the degree of flame retardancy that is desired in the finished textile, as well as other technical and economic considerations known and understood by those skilled in the art. However, it is generally desirable that the padding bath should contain an amount of the phosphonate such that when the wet uptake is reduced to a dry deposit upon the textile or other substrate, the treated substrate will contain from about 5 to 50% of the hexahydrotriazine phosphonate derivative as based upon the dry weight of the substrate. Again, it is to be stressed that the latter limits are merely illustrative and may be varied so as to provide a finished article having any desired degree of flame retardancy.

The thus applied hexahydrotriazine phosphonate derivative may be cured in the wet state or it may be completely or, most preferably, partially dried before curing. Of course, it is realized that the hexahydrotriazine phosphonate derivatives encompassed by the present invention which do not contain double bonds, i.e., ethylenic unsaturation, are to be utilized as additive flame retardants since they are not curable. Typical applications for these compounds include their addition to viscous rayon, before spinning or to plastics before molding in order to enhance their flame retardancy.

On the other hand, the mode of curing in accordance with the process of this invention involves the use of a free radical reaction in order to induce the double bond, i.e., the ethylenic unsaturation, of both the alkenyl, such as allyl, and/or acryloyl groups present in these compounds to polymerize intermolecularly so as to form a cross-linked, insoluble resin in and/or on the individual fibers, or other structural elements, which comprise the textile or other substrate. Thus, the hexahydrotriazine phosphonate derivatives of the present invention which possess both the alkenyl, such as allyl, and acryloyl groups are especially preferred because they allow for wide variations in the speed and temperature of cure and yield highly desirable products as a result of the presence of these varied unsaturated groups.

It is understood, of course, that the present invention includes the use of mixtures of these hexahydrotriazine phosphonate derivatives described above as reactive flame retardants wherein only one or more of said hexahydrotriazine phosphonate derivatives in the mixture contains ethylenic unsaturation.

Free radical initiation of the desired polymerization reaction may be induced either by the use of those chemical catalysts known as free radical initiators or by the use of the actinic radiation. Suitable free radical catalysts encompass peroxygen compounds, which may be used as part of a so-called redox system which contains a chemical reducing agent in addition to the peroxygen compound, and azo compounds. Examples of suitable peroxygen are hydrogen peroxide, which is often used in conjunction with ferrous salts; ammonium, sodium or potassium persulfate; t-butyl hydroperoxide, benzoyl peroxide, lauroyl peroxide; dicumyl peroxide; cumene hydroperoxide; t-butyl peroxypivalate; methyl ethyl ketone peroxide; caprylyl peroxide, and tert - butylperoxymaleic acid, and acetyl peroxide. Examples of suitable azo catalysts include azobisisobutyronitrile and azobisisovaleronitrile. These catalysts should be used in an effective amount in the range of from about 0.01 to 5%, by weight, of the allyl phosphonate flame retardant; the precise amount required being dependent upon the tightness of the cure, i.e., the degree of crosslinking, which is required as well as the extent to which free radical chain inhibiting substances such as oxygen have been excluded from the system.

Actinic radiation, encompasses high energy protons and other particles capable of initiating free radical reactions including ultraviolet light, X-rays, gamma rays, alpha rays, beta rays, i.e., electron beam radiation and plasma, i.e., highly ionized atoms in the vapor state such as present in an electrical corona or glow discharge. A preferred source of actinic radiation involves the use of an electron beam, i.e., beta radiation, since equipment adaptable for textile and paper mill use is readily available and is eminently suited for rapid, continuous processing. In any event, regardless of the type of actinic radiation that is used, it should be applied in an effective dosage in the range of from about 0.1–10 megarads; the exact dosage being dependent on the tightness of cure required, the amount of inhibitors present and the geometry and nature of the substrate.

Where a cure is induced by the use of a free radical catalyst, the selected catalyst is generally activated by heating up to about 200° C. but, preferably, in the range of from about 60 to 165° C. so as to minimize any thermal damage to the substrate. Alternatively, the catalyst can be activated, even at ambient temperatures, by applying a reducing agent to the textile or other substrate either before or after applying the flame retardant reagent and catalyst. Suitable reducing agents include sulfur dioxide, ferrous salts, such as the halides and sulfates, as well as sulfurous, phosphorous, or hypophosphorous acids and their water soluble salts such, for example, as sodium bisulfite, sodium phosphite and sodium hypophosphite. The catalyst may also be activated by actinic radiation.

When actinic radiation is used, either alone or in combination with a free radical catalyst, it is only necessary to expose the substrate to a beam from a radiation source. If desired, this can be done at ambient temperature thus sparing the substrate from thermal damage. The exposure can be conveniently conducted by passing the substrate through the beam which may be produced, for example, by a bank of ultraviolet lamps, corona-discharge points, a cobalt-60 source, an X-ray source or an electron beam source. Reasonably homogenous radiation flux is desirable where an electron beam is used, thus the beam can be transversely scanned at a rapid rate across the substrate so as to evenly irradiate all points thereon. If desired, a suitable mechanical arrangement of rollers can be employed so that the substrate can be made to repeatedly pass through the radiation field thereby facilitating more complete use of the available radiation flux while also obtaining more uniform irradiation.

The use of radiation initiation does not generally require the use of a chemical activator. However, the efficiency of the radiation can frequently be improved by use of such an activator. Suitable activators for this purpose include ketones, such as acetone or benzoin; polycyclic hydrocarbons, such as polyphenyl; and, azo compounds such as azobisisobutyronitrile. Where an electron beam is used, the application of about 0.1–10 megarads, at a voltage sufficient to substantially penetrate the substrate to the depth to which the flame retardant polymer is to be formed, generally suffices to effect the desired cure.

The resulting cure, or polymerization, of the hexahydrotriazine phosphonate derivative which is induced by either a catalyst and/or actinic radiation generally takes place on the surface and within the body of the fibers, or other structural elements, which comprise the substrate. Moreover, in some cases the resulting polymer network may be grafted, or chemically bonded, on to the fiber molecules of the textile or other substrate. However, such grafting is not crucial to the attainment of a durable, flame retardant finish.

The irradiation of the substrate is usually carried out subsequent to the application of the phosphonate although, in the case of cellulosic fibers which can be irradiated so as to form stable, long lived free radical sites, the phosphonate compound can be applied subsequent to irradiation whereupon it will proceed to cure.

The process of this invention may, if desired, include the use of other free radical curable, i.e., polymerizable, comonomers, along with the selected hexahydrotriazine phosphonate derivative as a means of achieving variations in the properties of the resulting treated textiles. Thus, suitable optional comonomers for use in conjunction with these phosphonates include:

(1) Monomers containing an amide nitrogen such as acrylamide, methacrylamide, N-methylolacrylamide, diacetonylacrylamide, hydroxymethylated diacetonylacrylamide, methylenebisacrylamide, N-vinylpyrrolidone and cellulose grafted N-methylolacrylamide, the use of the latter monomer being disclosed in U.S. Pat. 3,434,161. The use of these amide nitrogen containing comonomers at a concentration of about 0.1–6 moles per mole of the phosphonate, permits a more economical finish, particularly with cellulosic fibers, since less of the more costly phosphonate monomer needs to be used in order to achieve a given level of flame retardancy.

(2) Monomers containing more than one polymerizable double bond such, for example, as the polyol polyacrylates or methacrylates, the glycol diacrylates, the glycol dimethacrylates, methylenebisacrylamide, triallylphosphate, alkyl divinylphosphinates, diallyl allylphosphonate and triallyl cyanurate. By using this class of comonomers, the crosslink density of the resulting finish can be increased thereby enhancing its durability with respect to wear and laundering.

(3) Monomers contributing to flame retardancy, i.e., monomers having phosphorus, bromine or chlorine atoms in their molecules including, for example, vinyl and vinylidene halides such as vinyl chloride, vinyl bromide, vinylidene chloride, vinylidene bromide and vinylidene chlorobromide; chloroprene; triallyl phosphate; diallyl allylphosphonate; diallyl cyanoethylphosphonate; diallyl carboxyethyl phosphonate; dialkyl vinylphosphonates such as diethyl vinylphosphonate, bis(2-chloroethyl)vinylphosphonate or its polycondensation products; and, in general all of the unsaturated phosphonate monomers disclosed in my copending applications Ser. Nos. 23,493 and 23,499, both filed Mar. 27, 1970 and including all the allyl 2-carbamoylalkylphosphonates disclosed in the hereinabove identified and related copending application. Application Ser. No. 23,499 is now U.S. Pat. 3,695,925. When utilized in the process of this invention, these optional comonomers can be present in the system in a wide range of concentrations depending on the function of the comonomer and desired properties of the final product.

It should be noted, at this point, that the use of the term "crosslinked" in describing the cured, fire retardant resins resulting from the polymerization of the selected hexahydrotriazine phosphonate derivative in the finishing process of this invention will indicate to those skilled in the art that these resins possess a highly intermeshed, three-dimensional configuration or network rather than a simple linear or branched structure of the type found in non-crosslinked copolymers. Thus, such crosslinked polymers may be further characterized by the fact that they will not lose more than about 20% of their total weight upon being extracted with methanol in a Soxhlet extractor. Moreover, as used in this disclosure, the term "fire retardant" is intended to refer to that particular property of a material which provides it with a degree of resistance of ignition and burning. Thus a fire or flame retardant textile, paper or other solid substrate is one which has a low level of flammability and flame spread. This property may be conveniently evaluated by means of any of the standard flame retardancy tests.

The process of this invention is compatible with a wide variety of other textile finishing operation which can be carried out prior, simultaneous with, or subsequent to the process of the invention. These other operations include application of durable press, softening, antistatic, abrasion resistance, water-repellent, soil-release, and antimicrobial finishes, as well as bleaching, dyeing, printing, flocking and texturing.

Thus, the finishing formulations of the invention may also optionally contain other types of ingredients known in the textile finishing art. For example, water and soil repellents, optical brighteners and colorants, softening agents such as polyethylene emulsions, hand-modifying agents, buffering agents, pH-controlling agents which may be acidic or basic, emulsified waxes, chlorinated paraffins, polyvinyl chloride, polyvinylidene chloride, homo- and copolymers of the alkyl acrylates and other resinous finishing agents may be added in conjunction with the finishing agents of the invention. And, where an extremely high degree of flame retardance is required, it is also possible to employ systems containing antimony oxides, a resinous binder, particularly one containing chlorine such as a chlorinated paraffin or polyvinyl chloride, along with the phosphonates required in the process of this invention. Moreover, in treating wood and paper substrates, the fire retardant finishes of this invention may be applied along with and as part of an aminoplastic binder resin. And, when used for finishing paper, these hexahydrotriazine phosphonate derivatives can be used in conjunction with any of the various adhesives, coatings, sizes, wet strength additives and other materials which are ordinarily employed in the paper finishing art.

All types of textiles may be treated by means of the process of this invention so as to provide them with durable, fire retardant finishes. Thus, one may treat textiles derived from natural fibers such as cotton, wool, silk, sisal, jute, hemp and linen, wood and from synthetic fibers including nylon and other polyamides; polyolefins such as polypropylene, polyesters such as polyethylene terephthalate; cellulosics such as rayon, cellulose acetate and triacetate; fiber glass (which is flammable when coated with organic sizing agents); acrylics and modacrylics, i.e., fibers based on acrylonitrile copolymers; saran fibers, i.e., fibers based on vinylidene chloride copolymers; rubber based fibers; spandex fibers, i.e. fibers based on a segmented polyurethane; vinal fibers, i.e., fibers based on vinyl alcohol copolymers; vinyan fibers, i.e., fibers based on vinyl chloride copolymers; and, metallic fibers. Textiles derived from blends of any of the above listed natural and/or synthetic fibers may also be treated by means of the process of this invention.

Where the fibers are of the synthetic types made by melt spinning or solvent spinning, the compounds of the invention may be added to the melt or solution before spinning and cured thereafter, such as by irradiation.

As used in this disclosure, the term "textiles" is meant to encompass woven or knitted fabrics which consist of continuous or discontinuous fibers bonded so as to form a fabric by mechanical entanglement, thermal interfiber bonding or by use of adhesive or bonding substances. Such non-woven fabrics may contain a certain percentage, up to 100% by wood pulp as well as conventional textile fibers in which case part of the bonding process is achieved by means of hydrogen bonding between the cellulosic pulp fibers. In non-woven fabrics, the finishing agents of this invention can serve not only as flame retardant finishes, but can also contribute to the interfiber bonding mechanism by serving as all or part of the adhesive or bonding resin component. This dual role can also be played by the finishing agents of this invention in fabric laminates where the finishing agent can at the same time serve as the interlaminar bonding agent and as the flame retardant. In both of these systems, i.e., non-woven fabrics and laminated fabrics, the finishing agents of this invention can also be blended with the usual bonding agents such, for example, as acrylic emulsion polymers, vinyl acetate homo- and copolymer emulsions, styrene butadiene rubber emulsions, urethane resin emulsions, polyvinyl chloride emulsions, vinyl chloride-alkyl acrylate copolymer emulsions, polyacrylates modified by vinyl carboxylic acid comonomers and the like.

It should also be noted, at this point, that in addition to being used to provide flame retardant finishes for textiles, the above described hexahydrotriazine phosphonates can also be employed for the flame retarding of a wide variety of polymeric substrates such as cellulose in the form of paper, wood, plywood, chipboard, jute, batting and the like; urethane foams, coatings and elastomers; aminoplast resins and phenolic resins as well as their composites with paper, wood flour and the like; alkyd coatings and molding resins; and, paints and varnishes derived from natural or synthetic resins. For example, the hexahydrotriazine phosphonate derivatives of this invention are admixed with unsaturated polyester resins. In particular, the phosphonates of this invention possessing unsaturation may be cured with the unsaturated polyester to provide durably flame retardant cured products from which the flame retardant cannot last by volatility or by solvent leaching. Moreover, the compounds of this invention, in particular those having multiple unsaturation may be admixed with vinyl polymers, rubber or polyolefins and cured, for instance by radiation or peroxides to increase the heat and flame resistance of the polymer, thus improving its utility for applications such as wire and cable insulation.

Having generally described the invention, the following examples are given for purposes of illustration. It will be understood that the invention is not limited to these examples, but is susceptible to different modifications that will be recognized by one of ordinary skill in the art.

EXAMPLE 1

This example illustrates the preparation of the hexahydrotriazine phosphonate derivative corresponding to structural formula I where $R^5$ and $R^6$ are $-CH=CH_2$ and $R^1$ and $R^2$ are methyl.

To 95.6 g. of 1,3,5-triacryloylhexahydro-1,3,5-triazine in 200 cc. of methylene chloride is added 42.7 g. of dimethyl phosphite and 5 g. of tetramethylguanidine (as a basic catalyst). The solution is refluxed overnight and then evaporated at 100° C. at aspirator vacuum to obtain a water soluble pale yellowish syrup. NMR analysis of the product mixture showed that one $CH_2=CHCO$ group and two $(CH_3O)_2P(O)CH_2CH_2CO-$ groups are present per three $NCH_2$ groups.

EXAMPLE 2

This example illustrates the preparation of the hexahydrotriazine phosphonate derivative corresponding to structural formula I where $R^5$ is $-CH_2CH_2PO(OCH_3)_2$, $R^6$ is $-CH=CH_2$ and $R^1$ and $R^2$ are methyl.

Using the method of Example 1, 95.6 g. of 1,3,5-triacryloylhexahydro-1,3,5-triazine and 85 g. of dimethyl phosphite is reacted to obtain the indicated product as a water soluble syrup exhibiting 3 vinylic protons and 12 methoxy protons per 6 N—$CH_2$—N protons in the NMR analysis.

EXAMPLE 3

This example illustrates the preparation of the hexahydrotriazine phosphonate derivative corresponding to structural formula I where $R^5$ and $R^6$ are both $$-CH_2CH_2PO(OCH_3)_2$$

and $R^1$ and $R^2$ are methyl.

A mixture of 62.3 g. of 1,3,5-triacryloylhexahydro-1,3,5-triazine, 100 g. of dimethyl phosphonate, and 3 g. of tetramethyl guanidine is mixed, heated to 120° C. and then worked up as in Example 1. The crude product, a colorless solid, is recrystallized from benzene to obtain the pure crystalline compound having a m.p. of 102–4° C. The infrared spectrum indicates the absence of C=C bonds, supporting the structure:

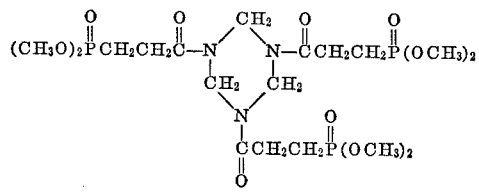

Anal.—Calculated for $C_{18}H_{36}O_{12}N_3P_3$: P, 16.05, N, 7.25. Found: P, 15.8, N, 7.0.

EXAMPLE 4

This example illustrates the preparation of the diallyl phosphite adducts of 1,3,5-triacryloylhexahydro-1,3,5-triazine.

To 43.8 parts by weight of diallyl phosphite and 22 parts of 1,3,5-triacryloylhexahydro-1,3,5-triazine in 120 parts of methylene chloride, 1 part of sodium methoxide is added with stirring. An exothermic reaction occurs causing the mixture to boil, under reflux, for about 15 minutes. After 30 minutes, infrared examination of a sample of the reaction mixture shows no P—H structures present. The reaction mixture is then stripped free of solvent under reduced pressure, leaving the desired product, i.e., the 3:1 adduct of diallyl phosphite and 1,3,5-triacryloylhexahydro-1,3,5-triazine as an amber syrup $n_D^{25}$ 1.5091.

Infrared analysis of the structure indicates the absence of the P—H bond at 2420 cm.$^{-1}$, the absence of the $CH_2=CHCO-$ double bond at 1612 cm.$^{-1}$, and the presence of a phosphonate P=O at 1240–1250 cm.$^{-1}$. The yield is substantially quantitative.

In a like manner, the 1:1 and 2:1 adducts of diallyl phosphite and 1,3,5-triacryloylhexahydro-1,3,5 - triazine are prepared by employing 14.6 parts and 29.2 parts, respectively, of diallyl phosphite in the above procedure.

EXAMPLE 5

This example illustrates the preparation of a thermoset resin of a hexahydrotriazine phosphonate derivative corresponding to structural formula I.

A mixture of the product of Example 1 and 1%, by weight, of benzoyl peroxide is heated to 100° C. for 1 hour in a mold. A clear, light yellow, hard molded object is obtained which is rapidly self-extinguishing when ignited by a burner flame.

EXAMPLE 6

This example illustrates the preparation of a textile flame retarding finish by means of the process of this invention.

An aqueous solution of 26.5 g. of the product of Example 1 and 0.5 g. of ammonium persulfate is prepared and padded onto pieces of cotton and Dacron, i.e., polyethylene terephthalate, cloth. The cloths are wrung out to a wet add-on of 70–80%, then cured by exposure to steam for ½ hour and finally oven-dried at 100° C. They are self-extinguishing both before and after laundering.

EXAMPLE 7

This example again illustrates the preparation of a textile flame retarding finish by means of the process of this invention.

A 35% aqueous solution of the product derived by adding 1.5 moles of dimethyl phosphite to 1 mole of 1,3,5-triacryloylhexahydro-1,3,5-triazine as prepared by the method of Example 1 is padded onto a poly(ethylene terephthalate), a polypropylene and a cotton cloth, dried in air and the thus treated cloths irradiated by 5 megarads of 300 kv. beta radiation using a Dynacoat electron accelerator (manufactured by Radiation Dynamics, Inc., Westbury, L.I., N.Y.). The resultant cloths are washed with hot water and then given an accelerated laundering by boiling for 3 hours with 0.2% $Na_2CO_3$–0.5% soap solution. Testing of the fabrics indicates the following results:

TABLE 1

| Fabric | Percent P analysis by X-ray fluorescence | | | Flammability after soda boil |
|---|---|---|---|---|
| | Before $H_2O$ wash | After $H_2O$ wash | After soda boil | |
| Cotton | 1.68 | 1.78 | 1.06 | Self-extinguishing |
| Dacron | 1.35 | 1.06 | 1.08 | Do. |
| Polypropylene | 1.66 | 1.44 | 1.22 | Do. |

EXAMPLE 8

This example illustrates the use of the product of Example 3 as an additive flame retardant according to the process of this invention.

Self-extinguishing films of cellulose acetate are prepared containing 10% of the product of Example 3 which is incorporated by admixture with a solution of the cellulose acetate in alcohol-acetone prior to the casting of the film.

EXAMPLE 9

This example illustrates a comparison of the flame retarding characteristics of the hexahydrotriazine phosphonate derivatives of this invention with a related prior art flame retardant on a cellulosic substrate.

Solutions are made up of (1) the adduct of 3 moles of diallyl phosphite and 1 mole of 1,3,5-triacryloylhexahydro-1,3,5-triazine, prepared according to Example 4, and (2) the adduct of 1 mole of diallyl phosphite and 1 mole of acrylonitrile, each of (1) and (2) being formulated at 2 g./10 cc. and 4 g./10 cc. using water as the solvent for (1) and methanol as the solvent for (2). Paper sheets are impregnated with these four solutions, dried in air, and cured by one day's exposure, at room temperature, to the radiation from a high pressure mercury arc lamp, i.e., the results of the evaluation of the dry add-on and flammability before and after washing in running water for 15 minutes are tabulated below in Table 2. The flammability is determined by the "match angle test" of the U.S.D.A.-S.R.R.L., Beninate et al., Textile Research Journal, 369–370 (1969).

TABLE 2

| | | Before washing | | After washing | |
|---|---|---|---|---|---|
| | g./cc. | Percent dry add-on | Flammability* | Percent dry add-on | Flammability* |
| (1) 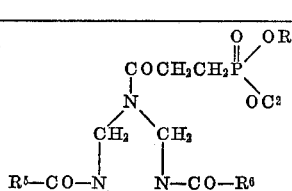 | 2 | 37.4 | +++ | 33.3 | +++ |
| | 4 | 67.7 | +++ | 63.5 | +++ |
| (2) $(CH_2=CH-CH_2O)_2\overset{O}{\underset{\|}{P}}-CH_2CH_2C=N$ | 2 | 7.4 | ± | 1.0 | — |
| | 4 | 10.5 | + | 1.9 | — |

*Symbols: — burns in any position; ± some samples self-extinguishing in horizontal position; + self-extinguishing in horizontal position; ++ self-extinguishing at 45°; +++ self-extinguishing in vertical position.

The dry add-on percentage is the weight of the treated paper less its original weight divided by the original weight multiplied by 100.

Accordingly, the test results in Table 2 indicate the superior durability and flame retardant properties achieved employing the compounds and processes of this invention in contrast to somewhat related allylphosphonate compounds of the prior art.

EXAMPLE 10

This example illustrates the use of a hexahydrotriazine phosphonate derivative of this invention in flame retarding an unsaturated polyester.

To an unsaturated polyester (of the type made by esterifying phthalic and maleic anhydrides with a glycol and then diluting the polyester with styrene) is added 10% by weight of the 3 to 1 adduct of diallyl phosphite and 1,3,5-triacryloylhexahydro-1,3,5-triazine made according to Example 4. The resin mixture is then cured by heating at 100° C. for 10 hours with 1% benzoyl peroxide. The flammability of the resultant cured polyesters is evaluated by the "limiting oxygen index" (LOI) method as described by Fenimore and Martin, *Modern Plastics*, 44, 141 (1966). The resultant value, which represents the minimum oxygen concentration (in mole percent) at which a rod of the polymer will continue to burn when ignited at the top in a vertical position, are illustrated as follows in Table 3 below. Thus, a higher LOI is indicative of a higher degree of flame retardancy.

TABLE 3

| Material | LOI |
|---|---|
| Unsaturated polyester | 17.7 |
| Unsaturated polyester and 10% 3:1 diallyl phosphite/triacryloyl-hexahydrotriazine adduct | 20.75 |

In the manner like to Examples 1–4, the following addition reactions are performed, in each case using 1,3,5-triacryloylhexahydro-1,3,5-triazine (TAHHT) as one of the reactants:

invention are useful as chemical intermediates for the production of the corresponding glycidyl esters with for example, peracetic acid, said esters being useful as reactive flame retardents and finishing agents for textiles.

Obviously, numerous modifications and variations of the present invention are possible in the light of the above teachings. It is therefore to be understood that within the scope of the appended claims the invention may be practiced otherwise then as specifically described herein.

What is claimed is:

1. A hexahydrotriazine phosphonate derivative corresponding to the structural formula:

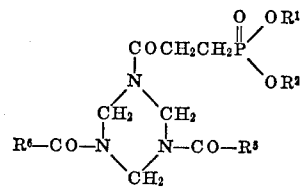

wherein $R^5$ and $R^6$ are the same or different radicals and are selected from the group consisting of

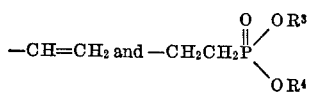

and wherein $R^1$, $R^2$, $R^3$ and $R^4$ are the same or different and are radicals selected from the group consisting of alkyl, cycloalkyl, alkenyl, alkylene, carbocyclic aryl, and carbocyclic arylalkyl; said $R^1$, $R^2$, $R^3$ and $R^4$ radicals having from 1 to about 20 carbon atoms and either unsubstituted or substituted by non-interfering substituents selected from the group consisting of halogen, alkoxy and hydroxy, wherein the terminal valency of any such alkylene radical is linked to the same or another phosphonate molecule conforming to the above formula; and mixtures of said hexahydrotriazine phosphonate derivatives.

| No. | Phosphite used | Added moles/mole TAHHT | Solvent, T., ° C. | Catalyst | Nature of adduct |
|---|---|---|---|---|---|
| 11 | [(CH₃)₂CHO]₂PHO | 1.5 | CH₃OCH₂CH₂OCH₃, 20-70% | Sodium metal, 0.1% | Syrup, water soluble. |
| 12 | (C₁₈H₃₇O)₂PHO | 1 | CH₂Cl₂ | Tetramethyl guanidine, 3% | Waxy, solid. |
| 13 | (⌬—O)₂PHO | 3 | None (melt) 100° | Triethylene diamine, 1% | Crystalline solid. |
| 14 | CH₃\C(CH₃)(CH₂—O)₂PHO | 1 | do | Sodium methylate, 1% | Waxy, solid. |
| 1 | HOC₃H₆OC₃H₆OPOC₃H₆OC₃H₆OH | 1 | Dioxane, 25-100° | do | Viscous syrup. |
| | HOC₂H₄OC₂H₄—[O—PH(O)C₂H₄OC₂H₄]₃—OH | 1 | Dioxane | do | Do. |
| 17 | (CH₂BrCHBrCH₂O)₂PHO | 1 | CH₂Cl₂, reflux | Tetramethyl guanidine, 1% | Do. |
| 18 | OHP(OCH₂)₂C(CH₂O)₂PHO | 1/2 | CH₂Cl, reflux | Sodium methylate, 0.5% | Wax. |
| 19 | (C₂H₅O)₂PHO and (CH₃O)₂PHO | 1+1 | CH₂Cl₂, reflux | do | Viscous syrup, water soluble. |
| 20 | CH₃O—PHO—OCH₂CH=CH₂ | 3 | do | do | Syrup. |

In addition to their use as flame retarding agents, the allyl phosphonate hexahydrotriazine derivatives of this 2. A hexahydrotriazine phosphonate derivative according to Claim 1 wherein $R^5$ and $R^6$ are —CH=CH₂.

3. A hexahydrotriazine phosphonate derivative according to Claim 1 wherein $R^5$ and $R^6$ are

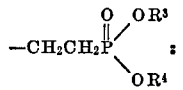

4. A hexahydrotriazine phosphonate derivative according to Claim 1 wherein $R^5$ is

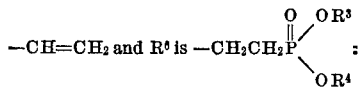

5. A hexahydrotriazine phosphonate derivative according to Claim 1 wherein at least one of said $R^1$, $R^2$, $R^3$ and $R^4$ is 2,3-dibromopropyl.

6. A hexahydrotriazine phosphonate derivative according to Claim 2 wherein $R^1$ and $R^2$ are the same or different and are selected from the group consisting of allyl and $C_1$-$C_{20}$ alkyl.

7. A hexahydrotriazine phosphonate derivative according to Claim 3 wherein $R^1$, $R^2$, $R^3$ and $R^4$ are the same or different and are selected from the group consisting of allyl and $C_1$-$C_{20}$ alkyl.

8. A hexahydrotriazine phosphonate derivative according to Claim 4 wherein $R^1$, $R^2$, $R^3$ and $R^4$ are the same or different and are selected from the group consisting of allyl and $C_1$-$C_{20}$ alkyl.

9. A hexahydrotriazine phosphonate derivative according to Claim 6 wherein $R^1$ and $R^2$ are the same $C_1$-$C_4$ alkyl.

10. A hexahydrotriazine phosphonate derivative according to claim 7 wherein $R^1$, $R^2$, $R^3$ and $R^4$ are the same $C_1$-$C_4$ alkyl.

11. A hexahydrotriazine phosphonate derivative according to claim 8 wherein $R^1$, $R^2$, $R^3$ and $R^4$ are the same $C_1$-$C_4$ alkyl.

12. A hexahydrotriazine phosphonate derivative according to Claim 6 wherein $R^1$ and $R^2$ are allyl.

13. A hexahydrotriazine phosphonate derivative according to Claim 7 wherein $R^1$, $R^2$, $R^3$ and $R^4$ are allyl.

14. A hexahydrotriazine phosphonate derivative according to Claim 8 wherein $R^1$, $R^2$, $R^3$ and $R^4$ are allyl.

15. A hexahydrotriazine phosphonate derivative according to Claim 9 wherein $R^1$ and $R^2$ are methyl.

16. A hexahydrotriazine phosphonate derivative according to Claim 10 wherein $R^1$, $R^2$, $R^3$ and $R^4$ are methyl.

17. A hexahydrotriazine phosphonate derivative according to Claim 11 wherein $R^1$, $R^2$, $R^3$ and $R^4$ are methyl.

References Cited
UNITED STATES PATENTS

| | | | |
|---|---|---|---|
| 3,666,401 | 5/1972 | Cahill et al. | 8—116.2 |
| 3,666,402 | 5/1972 | Meyers et al. | 8—116.2 |
| 3,627,784 | 12/1971 | Machbar et al. | 8—116 P |

JOHN M. FORD, Primary Examiner

U.S. Cl. X.R.

8—190; 117—136; 252—8.1

UNITED STATES PATENT OFFICE
CERTIFICATE OF CORRECTION

Patent No. 3,849,409    Dated November 19, 1974

Inventor(s) Edward D. Weil

It is certified that error appears in the above-identified patent and that said Letters Patent are hereby corrected as shown below:

Col. 2, the formula between lines 22 and 30, change the portion reading

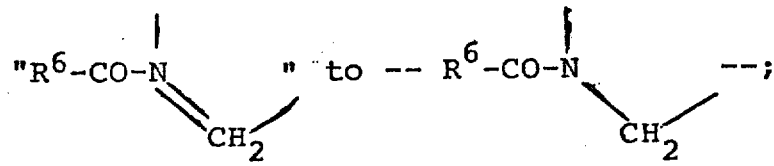

Col. 2, the second formula between lines 31 and 36, change the portion reading

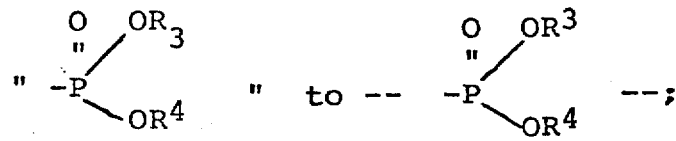

Col. 3, in formulae (IV), (V) AND (VI) the open valent bond in the first formula fragment listed above the heterocyclic ring should be attached to the nitrogen atom having two valent bonds;

Col. 4, formula (X), change the portion reading

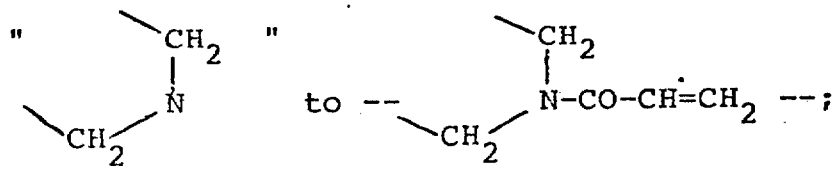

UNITED STATES PATENT OFFICE
CERTIFICATE OF CORRECTION

PO-1050
(5/69)

Patent No. 3,849,409     Dated November 19, 1974

Inventor(s) Edward D. Weil

It is certified that error appears in the above-identified patent and that said Letters Patent are hereby corrected as shown below:

Col. 12, change "1.06" next to "Self-extinguishing" to -- 1.08 --;

Col. 12, in formula 1 change the portion "OC2 to -- OR2 --;

Col. 14, line 4, change "retardents" to -- retardants--;

Col. 13, add -- Example -- above "No." in the left hand column of the Table at the bottom of the page;

Col. 13, Table at bottom of page, add -- 15 and -- 16 --, respectively, where dash lines appear between Nos. 14 and 17 in the Table.

Signed and sealed this 10th day of June 1975.

(SEAL)
Attest:

RUTH C. MASON
Attesting Officer

C. MARSHALL DANN
Commissioner of Patents
and Trademarks